United States Patent
Chung et al.

(10) Patent No.: US 10,233,267 B2
(45) Date of Patent: Mar. 19, 2019

(54) METHOD FOR PREPARING ACRYLONITRILE-BUTADIENE-STYRENE GRAFT COPOLYMER AND ACRYLONITRILE-BUTADIENE-STYRENE THERMOPLASTIC RESIN COMPRISING THE SAME

(71) Applicant: LG CHEM, LTD., Seoul (KR)

(72) Inventors: Sun Haeng Chung, Daejeon (KR); Young Min Kim, Daejeon (KR); Jin Hyoung Lee, Daejeon (KR); Su Jeong Han, Daejeon (KR); Yoo Vin Kim, Daejeon (KR); Young Hwan Jeong, Daejeon (KR); Jae Min Suk, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/607,268

(22) Filed: May 26, 2017

(65) Prior Publication Data

US 2017/0260303 A1    Sep. 14, 2017

Related U.S. Application Data

(63) Continuation-in-part of application No. PCT/KR2015/013450, filed on Dec. 9, 2015.

(30) Foreign Application Priority Data

Dec. 11, 2014  (KR) ........................ 10-2014-0178745

(51) Int. Cl.
| | | |
|---|---|---|
| C08L 25/12 | (2006.01) | |
| C08F 2/44 | (2006.01) | |
| C08F 2/22 | (2006.01) | |
| C08F 279/02 | (2006.01) | |
| C08L 55/02 | (2006.01) | |
| C08F 2/26 | (2006.01) | |
| C08F 2/30 | (2006.01) | |

(52) U.S. Cl.
CPC ............. *C08F 2/44* (2013.01); *C08F 2/22* (2013.01); *C08F 2/26* (2013.01); *C08F 2/30* (2013.01); *C08F 279/02* (2013.01); *C08L 25/12* (2013.01); *C08L 55/02* (2013.01); *C08F 2800/20* (2013.01)

(58) Field of Classification Search
None
See application file for complete search history.

(56) References Cited

U.S. PATENT DOCUMENTS

| | | | |
|---|---|---|---|
| 2003/0114580 A1 | 6/2003 | Kim et al. | |
| 2005/0239962 A1* | 10/2005 | Yoo | C08F 279/02 525/71 |
| 2006/0079649 A1* | 4/2006 | Jung | C08F 2/22 525/301 |
| 2011/0229646 A1* | 9/2011 | Kim | C08F 236/12 427/385.5 |
| 2011/0244240 A1 | 10/2011 | Kim et al. | |

FOREIGN PATENT DOCUMENTS

| | | | | |
|---|---|---|---|---|
| CN | 102206308 A | 10/2011 | | |
| CN | 102311527 A | 1/2012 | | |
| EP | 2404941 A1 * | 1/2012 | ............ | C08F 220/18 |
| EP | 2404941 A1 | 1/2012 | | |
| JP | 2013-221116 A | 10/2013 | | |
| KR | 10-2002-0036556 A | 5/2002 | | |
| KR | 10-2004-0059027 A | 7/2004 | | |
| KR | 20070060681 A | 6/2007 | | |
| KR | 10-0806123 B1 | 2/2008 | | |
| KR | 20110065019 A | 6/2011 | | |
| KR | 10-1223295 B1 | 1/2013 | | |
| KR | 10-1288752 B1 | 7/2013 | | |
| KR | 10-2014-0046760 A | 4/2014 | | |

OTHER PUBLICATIONS

International Search Report for PCT/KR2015/013450 filed on Dec. 9, 2015.
Extended European Search Report for EP Application No. 15868651.9 dated Sep. 22, 2017.
Office Action dated Oct. 19, 2018 for Chinese Application No. 20180160169242.

* cited by examiner

*Primary Examiner* — Robert S Loewe

(57) ABSTRACT

The present invention relates to a method for preparing an acrylonitrile-butadiene-styrene graft copolymer having improved impact strength, which comprises: a step of preparing diene-based rubber latex by adding an acrylate-based cross-linking agent (Step 1); and a step of inserting the same cross-linking agent with the acrylate-based cross-linking agent, an aromatic vinyl-based compound and a vinyl cyan-based compound to the diene-based rubber latex and then subjecting thereof to graft copolymerization (Step 2), an acrylonitrile-butadiene-styrene graft copolymer prepared by the method, and an acrylonitrile-butadiene-styrene thermoplastic resin comprising the same.

18 Claims, No Drawings

METHOD FOR PREPARING ACRYLONITRILE-BUTADIENE-STYRENE GRAFT COPOLYMER AND ACRYLONITRILE-BUTADIENE-STYRENE THERMOPLASTIC RESIN COMPRISING THE SAME

CROSS-REFERENCE(S) TO RELATED APPLICATIONS

This application is a continuation-in-part of PCT/KR2015/013450 filed Dec. 9, 2015, which claims priority of Korean Patent Application No. 10-2014-0178745, filed on Dec. 11, 2014, in the Korean Intellectual Property Office, which are hereby incorporated by reference in their entirety.

TECHNICAL FIELD

The present invention relates to a method for preparing an acrylonitrile-butadiene-styrene graft copolymer having improved impact strength, the acrylonitrile-butadiene-styrene graft copolymer prepared by the method, and an acrylonitrile-butadiene-styrene thermoplastic resin comprising the same.

BACKGROUND

In general, an acrylonitrile-butadiene-styrene-based resin (hereinafter, called 'ABS' resin) is widely used for electrical insulation, electronic parts, office machines, car parts and the like due to its relatively good properties such as impact resistance, mechanical strength, moldability, gloss and the like.

The ABS resin is prepared by a general emulsion polymerization method, for example, an emulsion polymerization method, which prepares diene-based rubber latex by emulsion polymerization, and then subjecting the latex to a graft reaction after adding an aromatic vinyl-based compound, a vinyl cyan-based compound and the like thereto to provide impact strength. Moreover, ABS thermoplastic resin can finally be prepared by mixing the graft copolymer prepared by the method with styrene-acrylonitrile-based resin (hereinafter, 'SAN' resin).

In recent efforts, in order to increase productivity and to improve production quality of this ABS resin, the proportion of rubbery polymer such as the diene-based rubber latex used for preparing the ABS graft copolymer is increasing. Because the content of the vinyl-based monomer is necessarily reduced when the content of this rubbery polymer is increased, the amount of grafted vinyl-based polymer will fall short. As a result, gloss is markedly reduced as incompletely grafted rubber polymers are fused during melt processing, and when the polymers stay at high temperature, there is a problem that thermal-depolymerization quickly progresses. However, there attempts to increase the rubber content face substantial technical challenges.

Moreover, because polymerization reaction should be generally performed for 30 hours or more to prepare the diene-based rubber latex and the like, there are problems of increased production time and production cost. Moreover, there is a problem that because polymerization conversion rate is quickly reduced at the polymerization conversion rate of 90% or higher when preparing the diene-based rubber latex, the polymerization conversion rate is not largely improved even if more reaction time is consumed. When conducting the polymerization under conditions of shorter reaction time and higher reaction temperature to overcome the problem, there are problems that particle diameter is decreased and reaction coagulation is increased. Thus, it was not easy to commercially prepare diene-based rubber latex having improved impact strength and ABS resin comprising the same.

Thus, in recent efforts, many companies have tried various methods for developing methods for preparing ABS resin to improve productivity, impact strength and the like in a process for preparing the ABS resin, but not changing the rubber content and not reducing other properties.

DISCLOSURE OF THE INVENTION

Technical Problem

In general, an acrylonitrile-butadiene-styrene-based resin (hereinafter, called 'ABS' resin) is widely used for electrical insulation, electronic parts, office machines, car parts and the like due to its relatively good properties such as impact resistance, mechanical strength, moldability, gloss and the like.

The ABS resin is prepared by a general emulsion polymerization method, for example, an emulsion polymerization method, which prepares diene-based rubber latex by emulsion polymerization to provide impact strength, and then subjecting the latex to a graft reaction after adding an aromatic vinyl-based compound, a vinyl cyan-based compound and the like thereto. Moreover, ABS thermoplastic resin can finally be prepared by mixing the graft copolymer prepared by the method with styrene-acrylonitrile-based resin (hereinafter, 'SAN' resin).

In recent efforts, in order to increase productivity and to improve production quality of this ABS resin, the content of rubbery polymer such as the diene-based rubber latex used for preparing the ABS graft copolymer is increasing. Because the content of the vinyl-based monomer is necessarily reduced when the content of this rubbery polymer is increased, the amount of the grafted vinyl-based polymer will fall short. As a result, gloss is markedly reduced as incompletely grafted rubber polymers are fused during melt processing, and when the polymers stay at high temperature, there is a problem that thermal-depolymerization quickly progresses. However, there is a technically challenging limit to increase the rubber content to a certain amount or more.

Moreover, because polymerization reaction should be generally conducted for 30 hours or more to prepare the diene-based rubber latex and the like, there are defects of increase of production time and production cost. Moreover, there is a defect that because polymerization conversion rate is quickly reduced at the polymerization conversion rate of 90% or higher when preparing the diene-based rubber latex, the polymerization conversion rate is not largely improved even if more reaction time is consumed. When conducting the polymerization under condition of shorter reaction time and higher reaction temperature to overcome the problem, there are problems that particle diameter is decreased and reaction coagulation is increased. Thus, it was not easy to commercially prepare diene-based rubber latex having improved impact strength and ABS resin comprising the same.

Thus, in recent times, many companies have tried various methods for preparing ABS resin to improve productivity, impact strength and the like in a process for preparing the ABS resin, but not changing the rubber content and not reducing other properties.

In order to accomplish the objects described above, an object of the present invention is to provide a method for preparing an acrylonitrile-butadiene-styrene graft copolymer.

The present invention also provides an acrylonitrile-butadiene-styrene graft copolymer prepared by the method.

The present invention also provides an acrylonitrile-butadiene-styrene thermoplastic resin comprising the acrylonitrile-butadiene-styrene graft copolymer.

Technical Solution

In order to accomplish the objects described above, one embodiment of the present invention provides a method for preparing an acrylonitrile-butadiene-styrene graft copolymer comprising: a step of preparing diene-based rubber latex by adding an acrylate-based cross-linking agent (Step 1); and a step of inserting the same cross-linking agent with the acrylate-based cross-linking agent, an aromatic vinyl-based compound and a vinyl cyan-based compound to the diene-based rubber latex and then subjecting thereof to graft copolymerization (Step 2).

Further, the present invention provides an acrylonitrile-butadiene-styrene graft copolymer prepared by the method. Further, the present invention provides an acrylonitrile-butadiene-styrene thermoplastic resin comprising the acrylonitrile-butadiene-styrene graft copolymer 20 weight % to 50 weight % of and styrene-acrylonitrile copolymer 50 weight % to 80 weight %.

Advantageous Effects

According to the present invention, in the case of preparing the diene-based rubber latex and the acrylonitrile-butadiene-styrene graft copolymer by adding an acrylate-based cross-linking agent, the cross-linking agent lowers cross-linking density by controlling the distance between the cross-linking points of the conjugated diene-based compound distant during polymerization reaction, and as a result, an effect of increasing impact strength of the acrylonitrile-butadiene-styrene graft copolymer and the acrylonitrile-butadiene-styrene thermoplastic resin comprising the same can be obtained.

MODE FOR CARRYING OUT THE INVENTION

Hereinafter, the present invention will be described in more detail in order to help the understanding of the present invention.

It should be understood that the terms or words used in the specification and the appended claims should not be construed as limited to general and dictionary meanings, but interpreted based on the meanings and concepts corresponding to technical aspects of the present invention on the basis of the principle that the inventor is allowed to be his own lexicographer.

Specifically, one embodiment of the present invention provides, in a method for preparing an acrylonitrile-butadiene-styrene graft copolymer, a method for preparing an acrylonitrile-butadiene-styrene graft copolymer, which comprises: a step of preparing diene-based rubber latex by adding an acrylate-based cross-linking agent (Step 1); and a step of inserting the same cross-linking agent with the acrylate-based cross-linking agent, an aromatic vinyl-based compound and a vinyl cyan-based compound to the diene-based rubber latex and then subjecting thereof to graft copolymerization (Step 2).

Specifically, in the method of the present invention, the (Step 1) is a step preparing a diene-based rubber latex by adding an acrylate cross-linking agent.

Namely, in the (Step 1), the diene-based rubber latex can be prepared by the method comprising:

inserting a conjugated diene-based monomer 50 parts by weight to 75 parts by weight, an emulsifier 1 part by weight to 3 parts by weight, a polymerization initiator 0.1 part by weight to 0.4 part by weight, an electrolyte 0.1 part by weight to 3 parts by weight, a molecular weight modifier 0.1 part by weight to 0.5 part by weight and ion exchanged water 65 parts by weight to 100 parts by weight into a reactor in a batch, while stirring thereof, inserting an acrylate-based cross-linking agent 0.05 part by weight to 0.3 part by weight thereto, based on the conjugated diene monomer 100 parts by weight, and then subjecting thereof to the first polymerization;

inserting a remaining conjugated diene-based monomer mixture and the emulsifier 0 part by weight to 0.1 part by weight at the time when polymerization conversion rate of the first polymerization is 35% to 55%, and then subjecting thereof to the second polymerization; and completing the polymerization reaction by inserting a polymerization inhibitor thereinto at the time when the polymerization conversion rate of the first polymerization is 90% to 95% or higher.

At this time, the conjugated diene-based monomer may be a single material of the conjugated diene-based monomer, or a mixture composed of the conjugated diene-based monomer and at least one co-monomer selected from the group consisting of the aromatic vinyl-based monomer and the vinyl cyan-based monomer. At this time, in the case that the conjugated diene-based monomer is the mixture of the monomers, the conjugated diene-based monomer may comprise the conjugated diene-based monomer 80 weight % to 99 weight %; and at least one co-monomer selected from the group consisting of the aromatic vinyl-based monomer and the vinyl cyan-based monomer 1 weight % to 20 weight %, in the total content of the conjugated diene monomers.

At this time, the conjugated diene-based monomer may comprise a single material or at least two compounds selected from the group consisting of 1,3-butadiene, isoprene, chloroprene and piperylene, and specifically, it may be 1,3-butadiene.

The conjugated diene-based monomer is inserted in two steps, and this divided injection of the monomer has an effect of forming atmosphere capable of producing new polymer particles.

Further, the aromatic vinyl-based monomer may comprise a single material or at least two compounds selected from the group consisting of styrene, α-methyl styrene, m-methyl styrene, α-ethyl styrene, p-methyl styrene and p-tert-butyl styrene, and specifically, it may be styrene.

Further, the vinyl cyan-based monomer may comprise a single material or at least two compounds selected from the group consisting of acrylonitrile, methacrylonitrile, ethacrylonitrile and isopropyl acrylonitrile, and specifically, it may be acrylonitrile.

At least one selected from the group consisting of acrylate-based compounds such as methyl methacrylate, ethyl methacrylate, n-propyl methacrylate, i-propyl methacrylate, n-butyl methacrylate, 2-ethyl hexyl acrylate and the like may be additionally mixed to the conjugated diene-based monomer mixture.

In the first polymerization step for preparing the conjugated diene-based latex, the emulsifier may be a general anionic adsorption-type emulsifier, a non-ionic emulsifier, a reactive emulsifier or a polymeric reactive emulsifier and the like alone or in combination, but not particularly limited thereto. Its representative examples may include a single material or at least two compounds selected from the group consisting of alkyl aryl sulfonate, alkali methyl alkyl sulfonate, sulfonated alkyl ester, soap of fatty acid, alkali salt of oleic acid, alkali salt of stearic acid and alkali salt of rosin acid.

At this time, when preparing the conjugated diene-based latex, large-diameter rubber latex having low gel content and proper particle diameter can be easily formed by inserting the conjugated diene-based monomer mixture and the emulsifier in two steps according to the time point of polymerization conversion rate.

In the first polymerization step for preparing the conjugated diene-based latex, the polymerization initiator may be a water-soluble polymerization initiator, a lipid-soluble polymerization initiator or an oxidation-reduction catalyst and the like alone or in combination, but not particularly limited thereto. And as its representative examples, the water-soluble polymerization initiator may be at least one persulfate selected from the group consisting of potassium persulfate, sodium persulfate and ammonium persulfate, the lipid-soluble polymerization initiator may be selected from the group consisting of cumene hydroperoxide, diisopropyl benzene hydroperoxide, azobis isobutylnitrile, tertiary butyl hydroperoxide, paramethane hydroperoxide and benzoylperoxide, and the oxidation-reduction catalyst may be selected from the group consisting of sodium formaldehyde, sulfoxylate, sodium ethylenediamine tetraacetate, ferrous sulfate, dextrose, sodium pyrophosphate and sodium sulfite.

In the first polymerization step for preparing the conjugated diene-based latex, the electrolyte may be a single material or at least two compounds selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$Na$_4$P$_2$O$_7$, K$_3$PO$_4$, Na$_3$PO$_4$, K$_2$HPO$_4$ and Na$_2$HPO$_4$.

In the first polymerization step for preparing the conjugated diene-based latex, the molecular weight modifier is not particularly limited, and for example, it may be mercaptans such as α-methyl styrene dimer, t-dodecyl mercaptan, n-dodecyl mercaptan and octyl mercaptan; halogenated hydrocarbon such as carbon tetrachoride, methylene chloride and methylene bromide; and sulfur-containing compounds such as tetraethyl thiuram disulfide, dipentamethylene thiuram disulfide and diisopropylxanthogen disulfide. Preferably, it may be t-dodecyl mercaptan.

In particular, in the first polymerization step for preparing the conjugated diene-based latex of the (Step 1), the acrylate-based cross-linking agent to be used may be expressed as (propylene glycol)n diacrylate (at this time, n is an integer of 0 or 1 to 15), and at this time, in the (propylene glycol)n diacrylate, impact strength is tend to be improved as n increases, but if it is higher than 15, there is a defect of hindering stability. Representative examples of the acrylate-based cross-linking agent may be (propylene glycol)7 diacrylate or (propylene glycol)13 diacrylate.

At this time, if the content of the cross-linking agent is 0.05 part by weight or less, the impact strength improving effect is not large, and if it is more than 0.3 part by weight, there is a defect of hindering latex stability. Moreover, in the present invention, the cross-linking agent is inserted and reacted at the beginning of the polymerization reaction so that the cross-linking agent controls distance between the cross-linking points distant, thereby lowering cross-linking density. As a result, it has an effect of improving impact strength of the acrylonitrile-butadiene-styrene thermoplastic resin comprising the copolymer.

When preparing the conjugated diene-based latex, the first polymerization step and the second polymerization step may be performed under different temperature conditions, respectively. Specifically, the first polymerization step may be performed under a temperature condition of 60° C. to 75° C., and the second polymerization step may be performed under a temperature condition of 75° C. to 88° C. Namely, in the present invention, the polymerization may be performed by gradually increasing the temperature condition as the polymerization progresses.

Further, when preparing the diene-based rubber latex, the step of completing the polymerization may be performed by using the polymerization inhibitor in order to obtain the rubber polymer latex, and the polymerization inhibitor may be a common polymerization inhibitor known in the art.

The diene-based rubber latex prepared in the (Step 1) may be large-diameter diene-based rubber latex having average particle diameter(D50) of 2,500 Å to 5,000 Å.

Further, in the method of the present invention, the (Step 2) is a step of preparing the acrylonitrile-butadiene-styrene graft copolymer by adding the acrylate-based cross-linking agent.

Namely, the (Step 2) is a step of subjecting graft copolymerization by additionally mixing the acrylate-based cross-linking agent, and the aromatic vinyl-based compound and vinyl cyan-based compound to the diene-based rubber latex mixture prepared in the (Step 1) to obtain the acrylonitrile-butadiene-styrene graft copolymer.

At this time, all of the acrylate-based cross-linking agent, the aromatic vinyl-based compound and the vinyl cyan-based compound to be used are the same kinds of compounds with the compounds used when preparing the diene-based rubber latex of the (Step 1), but all different kinds of compounds may be used.

Further, the aromatic vinyl-based compound and the vinyl cyan-based compound may be added independently or in the form of a mixture to the diene-based rubber latex in a lump (or batch) or dividedly before initiating the reaction; or the aromatic vinyl-based compound and the vinyl cyan-based compound may be continuously added in the emulsified form before initiating the reaction. Preferably, the aromatic vinyl-based compound and the vinyl cyan-based compound may be continuously added to the diene-based rubber latex mixture in the emulsified form. In the case of continuous addition by the method, there are advantages that polymerization reaction speed can be enhanced, and polymerization conversion rate can be increased.

In the step of graft copolymerization of the (Step 2), the diene-based rubber latex is used as a seed, and the aromatic vinyl-based compound and the vinyl cyan-based compound are polymerized thereto to form branches. The graft copolymerization step may be performed at a temperature range of 50° C. to 90° C. for 2 hours to 5 hours.

Further, in the (Step 2), when preparing the acrylonitrile-butadiene-styrene graft copolymer, content ratio of the diene-based rubber latex, the acrylate cross-linking agent, the aromatic vinyl-based compound and the vinyl cyan-based compound may preferably comprise the diene-based rubber latex prepared in the (Step 1) 45 parts by weight to 70 parts by weight, the same cross-linking agent with the agent used in the (Step 1) 0.05 part by weight to 0.3 part by weight, styrene 25 parts by weight to 40 parts by weight, acrylonitrile 5 parts by weight to 20 parts by weight, based on the total of the diene-based rubber latex and the monomer mixture 100 parts by weight. Further, as an additive, the polymerization initiator 0.1 part by weight to 0.4 part by weight and the molecular weight modifier 0.1 part by weight to 0.5 part by weight may be additionally inserted thereto.

On the other hand, the graft copolymerization of the (Step 2) may be performed by additionally adding an emulsifier, a polymerization initiator, an electrolyte or a molecular weight modifier other than the above materials as occasion demands.

At this time, all of the emulsifier, the polymerization initiator, the electrolyte or the molecular weight modifier and the like to be used may be same compounds formed the compounds used when preparing the diene-based rubber latex of the (Step 1), but all different kinds of compounds may be used.

For example, the emulsifier may be a general anionic adsorption-type emulsifier, a non-ionic emulsifier, a reactive emulsifier or a polymeric reactive emulsifier and the like alone or in combination as mentioned above, but not particularly limited thereto. As its representative examples, the anionic adsorption-type emulsifier such as potassium rosinate, potassium fatty acid salt, sodium lauryl sulfonate, sodium alkylbenzene sulfonate and the like; the non-ionic emulsifier such as polyoxyethylene alkylphenyl ether and the like; the reactive emulsifier such as sodium dodecyl allyl sulfosuccinate, dipotassium $C_{16-18}$ alkenyl succinate, sodium acrylamido stearate and the like; and the polymeric reactive emulsifier such as polyoxyethylene alkyl phenyl ether ammonium sulfate, polyoxyethylene alkyl ether sulfate ester ammonium salt and the like may be used alone or in combination. The emulsifier may be added in an amount of 0.1 part by weight to 1.5 parts by weight, based on the diene-based rubber latex 100 parts by weight, but not limited thereto.

The polymerization initiator may be a water-soluble persulfate-based polymerization initiator or a redox-based polymerization initiator and the like alone or in combination, but not particularly limited. As its representative examples, the water soluble persulfate-based polymerization initiator may comprise at least one selected from the group consisting of potassium persulfate, sodium persulfate and ammonium persulfate, and the redox-based polymerization initiator may be a polymerization initiator comprising peroxide selected from the group consisting of hydrogen peroxide, cumene hydroperoxide, diisopropyl benzene hydroperoxide, tertiary butyl hydroperoxide and paramethane hydroperoxide as one component. The polymerization initiator may be added in an amount of 0.1 part by weight to 0.3 part by weight, based on the diene-based rubber latex 100 parts by weight, but not limited thereto.

The electrolyte may comprise a single material or a mixture of at least two selected from the group consisting of KCl, NaCl, KHCO$_3$, NaHCO$_3$, K$_2$CO$_3$, Na$_2$CO$_3$, KHSO$_3$, NaHSO$_3$, K$_4$P$_2$O$_7$, Na$_4$P$_2$O$_7$, K$_3$PO$_4$, Na$_3$PO$_4$K$_2$HPO$_4$ and Na$_2$HPO$_4$. The electrolyte may be added in an amount of 0.2 part by weight to 2 parts by weight, based on the diene-based rubber latex 100 parts by weight, but not limited thereto.

The molecular weight modifier is not particularly limited, but it may be commonly known compounds such as mercaptans, and preferably, it may be tertiary dodecyl mercaptan. The molecular weight modifier may be added in an amount of 0.2 part by weight to 0.6 part by weight, based on the diene-based rubber latex 100 parts by weight, but not limited thereto.

Further, the present invention provides the acrylonitrile-butadiene-styrene graft copolymer prepared by the method.

At this time, preferably, monomer conversion rate of the acrylonitrile-butadiene-styrene graft copolymer may be 93% or higher, and coagulum (%) may be 0.06 to 1.

Further, one embodiment of the present invention provides the acrylonitrile-butadiene-styrene thermoplastic resin comprising the acrylonitrile-butadiene-styrene graft copolymer 20 weight % to 50 weight % and styrene-acrylonitrile copolymer 50 weight % to 80 weight %.

At this time, the styrene-acrylonitrile copolymer is not particularly limited, and it may be a compound prepared by a common preparation method known in the art.

At this time, gloss of the thermoplastic resin comprising the acrylonitrile-butadiene-styrene graft copolymer may be 90 or higher. Preferably, if the rubber content in the thermoplastic resin is less than 20 parts by weight, Izod impact strength according to ASTM D256 may be 32 kgf·m/m or higher at specimen thickness of ¼" and 35 kgf·m/m or higher at specimen thickness of ⅛", and if the rubber content is 20 parts by weight or more, it may be 38 kgf·m/m or higher at specimen thickness of ¼" and 43 kgf·m/m or higher at specimen thickness of ⅛".

[Mode for the Invention]

Hereinafter, the present invention will be described in more detail, according to the following Examples and Test Examples. However, the following Examples and Test Examples are merely presented to exemplify the present invention, and the scope of the present invention is not limited thereto

EXAMPLE

Example 1

(Step 1) Preparation of Diene-based Rubber Latex

Based on 1,3-butadiene 100 parts by weight, (propylene glycol)7 diacrylate as a cross-linking agent 0.1 part by weight, ion exchanged water 65 parts by weight, 1,3-butadiene 75 parts by weight, potassium rosinate as an emulsifier 1 part by weight and potassium oleate 0.8 part by weight, potassium carbonate (K$_2$CO$_3$) as an electrolyte 1.5 parts by weight, tertiary dodecyl mercaptan (TDDM) as a molecular weight modifier 0.3 part by weight, potassium persulfate (K$_2$S$_2$O$_8$) as an initiator 0.3 part by weight were inserted into a nitrogen-substituted polymerization reactor (Autoclave) in a batch, and reacted at a reaction temperature of 70° C. until polymerization conversion rate reached 60%. A remaining 1,3-butadiene 25 parts by weight was inserted thereinto in a lump and heated to 80° C., and then the reaction was completed when polymerization conversion rate reached 95%.

(Step 2) Preparation of Acrylonitrile-Butadiene-Styrene Graft Polymer

Emulsifying solution comprising the diene-based rubber latex prepared in the (Step 1) 60 parts by weight, (propylene glycol)7 diacrylate as a cross-linking agent 0.1 part by weight, tertiary butyl hydroperoxide 0.07 part by weight, styrene 30 parts by weight and acrylonitrile 10 parts by weight, based on 100 parts by weight of total of diene-based rubber latex and a monomer mixture constituting an acrylonitrile-butadiene-styrene graft copolymer, was continuously inserted into the nitrogen-substituted polymerization reactor for 60 min, tertiary dodecyl mercaptan (TDDM) 0.4 part by weight and cumene hydroperoxide 0.23 part by weight were inserted thereinto followed by heating to a reaction temperature of 80° C., and then the reaction was completed after 1 hour maturation. Then, the resulting material was inserted into a coagulation tank, which can be rapidly heated up to 100° C., heated to a temperature of 95° C. for 10 min, aggregated with aqueous sulfuric acid solution, and then dried by mother liquid separation to obtain acrylonitrile-butadiene-styrene graft copolymer powder.

(Step 3) Preparation of Acrylonitrile-Butadiene-Styrene Thermoplastic Resin

The acrylonitrile-butadiene-styrene graft copolymer powder prepared in the (Step 2) 25 parts by weight and a styrene-acrylonitrile copolymer (LG SAN 92 HR) 75 parts by weight (copolymer resin comprising styrene 73 parts by weight and acrylonitrile 27 parts by weight and having weight average molecular weight of 120,000) were melt-blended at 200° C. using an extruder to prepare an acrylonitrile-butadiene-styrene thermoplastic resin. The resin was pelleted, and then subjected to an injection molding machine to obtain an acrylonitrile-butadiene-styrene thermoplastic resin test specimen.

Example 2

The procedure of Example 1 was repeated except for inserting (propylene glycol)13 diacrylate 0.1 part by weight instead of the (propylene glycol)7 diacrylate used as a cross-linking agent in the (Step 1) and the (Step 2) of Example 1 to obtain an acrylonitrile-butadiene-styrene thermoplastic resin test specimen.

Example 3

The procedure of Example 1 was repeated except for using the acrylonitrile-butadiene-styrene graft copolymer powder in an amount of 18 parts by weight and the styrene-acrylonitrile copolymer in an amount of 82 parts by weight when preparing the acrylonitrile-butadiene-styrene thermoplastic resin in the (Step 3) of Example 1 and then extruding thereof to obtain an acrylonitrile-butadiene-styrene thermoplastic resin test specimen.

Example 4

The procedure of Example 1 was repeated except for inserting the (propylene glycol)13 diacrylate 0.1 part by weight instead of the (propylene glycol)7 diacrylate used as a cross-linking agent in the (Step 1) and the (Step 2) of Example 1, using the acrylonitrile-butadiene-styrene graft copolymer powder in an amount of 18 parts by weight and the styrene-acrylonitrile copolymer in an amount of 82 parts by weight when preparing the acrylonitrile-butadiene-styrene thermoplastic resin in the (Step 3), and then extruding thereof to obtain an acrylonitrile-butadiene-styrene thermoplastic resin test specimen.

Comparative Example 1

The procedure of Example 1 was repeated except for inserting a general polyethylene glycol dimethacrylate 0.1 part by weight instead of the (propylene glycol)7 diacrylate used as a cross-linking agent in the (Step 1) and the (Step 2) of Example 1 to obtain an acrylonitrile-butadiene-styrene thermoplastic resin test specimen.

Test Example

1) Measuring coagulum

After completing the reaction, coagulation of each product was filtered with a 50 mesh net and dried. Then, coagulum of each acrylonitrile-butadiene-styrene graft copolymer prepared in Examples 1 to 4 and Comparative Example 1 was expressed as weight %, based on total solid and monomers inserted during the reaction. The measured results were shown in the following Tables 1 and 2.

2) Measuring Impact Strength

Each acrylonitrile-butadiene-styrene thermoplastic resin specimen prepared in Examples 1 to 4 and Comparative Example 1 was prepared to thickness of ¼" and ⅛", and then Izod impact strength of the specimen was measured using impact strength tester (TINIUS OLEN) according to ASTM D-256. The measured results were shown in the following Tables 1 and 2.

3) Measuring Gloss

For each acrylonitrile-butadiene-styrene thermoplastic resin specimen prepared in Examples 1 to 4 and Comparative Example 1, gloss was measured at 45° angle using a Gloss meter according to ASTM D-528, and the measured results were shown in the following Tables 1 and 2. At this time, higher gloss value means better gloss.

The following Table 1 shows the results of measuring properties (monomer conversion rate %) of the acrylonitrile-butadiene-styrene graft copolymers prepared in Examples 1 and 2 and Comparative Example 1 and properties of the acrylonitrile-butadiene-styrene thermoplastic resins comprising the same.

TABLE 1

| Section | Monomer Conversion Rate (%) | coagulum (wt %) | Impact Strength (kgf · m/m, ¼") | Impact Strength (kgf · m/m, ⅛") | Gloss | MI |
|---|---|---|---|---|---|---|
| Example 1 | 93.3 | 0.06 | 38.66 | 43.64 | 90.9 | 20.8 |
| Example 2 | 93.0 | 0.09 | 39.80 | 43.23 | 91.0 | 20.6 |
| Comparative Example 1 | 93.5 | 0.05 | 33.45 | 36.75 | 89.8 | 19.9 |

As shown in Table 1, it can be found that impact strength of the acrylonitrile-butadiene-styrene graft copolymers of Examples 1 and 2, which were prepared by adding the cross-linking agent ((propylene glycol)n diacrylate (n=7, 13)) during polymerization reaction of the diene-based rubber latex and the acrylonitrile-butadiene-styrene graft copolymer, and the acrylonitrile-butadiene-styrene thermoplastic resin comprising the same was better than the acrylonitrile-butadiene-styrene thermoplastic resin comprising the acrylonitrile-butadiene-styrene graft copolymer of Comparative Example 1 prepared by adding a general cross-linking agent. Further, it can be confirmed that surface gloss, fluidity and thermal stability of the thermoplastic resin were also increased. According to this result, it can be found that the impact strength, the gloss, the fluidity and the thermal stability of the acrylonitrile-butadiene-styrene thermoplastic resin of Examples 1 and 2, which comprises the diene-based rubber latex prepared by adding the acrylate-based cross-linking agent ((propylene glycol)n diacrylate (n=7, 13)), and the acrylonitrile-butadiene-styrene graft copolymer, and were improved.

Further, the following Table 2 shows the result of measuring properties (monomer conversion rate %) of the acrylonitrile-butadiene-styrene graft copolymers prepared in Examples 3 and 4 and Comparative Example 1 and properties of the acrylonitrile-butadiene-styrene thermoplastic resins comprising the same.

TABLE 2

| Section | Monomer Conversion Rate (%) | coagulum (wt %) | Impact Strength (kgf · m/m, ¼") | Impact Strength (kgf · m/m, ⅛") | Gloss | MI |
|---|---|---|---|---|---|---|
| Example 3 | 93.3 | 0.06 | 32.37 | 35.93 | 91.5 | 22.7 |
| Example 4 | 93.0 | 0.09 | 32.51 | 35.53 | 92.1 | 22.4 |
| Comparative Example 1 | 93.5 | 0.05 | 33.45 | 36.75 | 89.8 | 19.9 |

As shown in Table 2, it was confirmed that in the case of adding the acrylate-based cross-linking agent when polymerizing the diene-based rubber latex and the acrylonitrile-butadiene-styrene graft copolymer, although the content of the acrylonitrile-butadiene-styrene graft copolymer in the acrylonitrile-butadiene-styrene thermoplastic resin was reduced about 7 parts by weight, level of the impact strength was similar with the thermoplastic resin of Comparative Example 1. Moreover, it can be found that when reducing the content of the acrylonitrile-butadiene-styrene graft copolymer, the gloss and the fluidity of the acrylonitrile-butadiene-styrene thermoplastic resin was rather improved. According to this result, it could be found that productivity improvement and production cost reduction is possible by reducing the content of the rubber in the acrylonitrile-butadiene-styrene thermoplastic resin.

The invention claimed is:

1. A method for preparing an acrylonitrile-butadiene-styrene graft copolymer, which comprises:
   a first step of preparing a diene-based rubber latex by adding an acrylate-based cross-linking agent; and
   a second step of inserting the acrylate-based cross-linking agent, an aromatic vinyl-based compound and a vinyl cyan-based compound into the diene-based rubber latex and subsequently performing graft copolymerization,
   wherein the acrylate-based cross-linking agent is (propylene glycol)$_n$ diacrylate, in which n is an integer of 1 to 15.

2. The method for preparing an acrylonitrile-butadiene-styrene graft copolymer of claim 1, wherein the first step of preparing diene-based rubber latex comprises:
   inserting 50 parts by weight to 75 parts by weight of a conjugated diene-based monomer, 1 part by weight to 3 parts by weight of an emulsifier, 0.1 parts by weight to 0.4 parts by weight of a polymerization initiator, 0.1 parts by weight to 3 parts by weight of an electrolyte, 0.1 parts by weight to 0.5 part by weight of a molecular weight modifier and 65 parts by weight to 100 parts by weight of ion exchanged water into a reactor in a batch, while stirring;
   inserting 0.05 parts by weight to 0.3 parts by weight of an acrylate-based cross-linking agent, based on 100 parts by weight of the conjugated diene monomer, into the reactor and then performing a first polymerization;
   adding the balance of conjugated diene-based monomer and from 0 to 0.1 parts by weight of emulsifier, into the reactor and then performing a second polymerization; and
   terminating the second polymerization by inserting a polymerization inhibitor into the reactor at a time when the polymerization conversion rate of the first polymerization is at least 90%.

3. The method for preparing an acrylonitrile-butadiene-styrene graft copolymer of claim 2, wherein the conjugated diene-based monomer is a homogeneous material of the conjugated diene-based monomer, or
   wherein the conjugated diene-based monomer is a mixture comprising the conjugated diene-based monomer and at least one co-monomer selected from the group consisting of the aromatic vinyl-based monomer and the vinyl cyan-based monomer.

4. The method for preparing an acrylonitrile-butadiene-styrene graft copolymer of claim 3, wherein the mixture of the conjugated diene-based monomer comprises 80 weight % to 99 weight % of the conjugated diene-based monomer; and 1 weight % to 20 weight % of at least one co-monomer selected from the group consisting of the aromatic vinyl-based monomer and the vinyl cyan-based monomer.

5. The method for preparing an acrylonitrile-butadiene-styrene graft copolymer of claim 3, wherein the conjugated diene-based monomer comprises at least two compounds selected from the group consisting of 1,3-butadiene, isoprene, chloroprene and piperylene.

6. The method for preparing an acrylonitrile-butadiene-styrene graft copolymer of claim 3, wherein the aromatic vinyl-based monomer comprises at least two compounds selected from the group consisting of styrene, α-methyl styrene, m-methyl styrene, α-ethyl styrene, p-methyl styrene and p-tert-butyl styrene.

7. The method for preparing an acrylonitrile-butadiene-styrene graft copolymer of claim 3, wherein the vinyl cyan-based monomer comprises at least two compounds selected from the group consisting of acrylonitrile, methacrylonitrile, ethacrylonitrile and isopropyl acrylonitrile.

8. The method for preparing an acrylonitrile-butadiene-styrene graft copolymer of claim 1, wherein the acrylate-based cross-linking agent to be used when preparing the diene-based rubber latex is (propylene glycol)$_n$ diacrylate, in which n is an integer of 3 to 15.

9. The method for preparing an acrylonitrile-butadiene-styrene graft copolymer of claim 8, wherein the cross-linking agent is (propylene glycol)$_7$ diacrylate or (propylene glycol)$_{13}$ diacrylate.

10. The method for preparing an acrylonitrile-butadiene-styrene graft copolymer of claim 1, wherein the diene-based rubber latex prepared in the first step is large-diameter diene-based rubber latex whose average particle diameter (D50) is 2,500 Å to 5,000 Å.

11. The method for preparing an acrylonitrile-butadiene-styrene graft copolymer of claim 1, wherein in the second step, the aromatic vinyl-based compound and the vinyl cyan-based compound are added to the diene-based rubber latex in separately or simultaneously, respectively or in the form of a mixture before initiating a polymerization reaction;
   or wherein the aromatic vinyl-based compound and the vinyl cyan-based compound are added continuously in an emulsified form before initiating the polymerization reaction.

12. The method for preparing an acrylonitrile-butadiene-styrene graft copolymer of claim 1, wherein in the second step comprises adding 45 parts by weight to 70 parts by weight of the diene-based rubber latex prepared in the first step, and 0.05 part by weight to 0.3 part by weight of the acrylate cross-linking agent, 25 parts by weight to 40 parts by weight of styrene, 5 parts by weight to 20 parts by weight of acrylonitrile, 0.1 parts by weight to 0.4 parts by weight of polymerization initiator and 0.1 parts by weight to 0.5 parts by weight of the molecular weight modifier are inserted.

13. The method for preparing an acrylonitrile-butadiene-styrene graft copolymer of claim 1, wherein the graft copolymerization step of the second step is performed at a temperature range of 50° C. to 90° C. for 2 hours to 5 hours.

14. The method for preparing an acrylonitrile-butadiene-styrene graft copolymer of claim 1, wherein the graft copolymerization step of the second step is performed by additionally adding an emulsifier, a polymerization initiator, an electrolyte or a molecular weight modifier.

15. An acrylonitrile-butadiene-styrene graft copolymer prepared by the method of claim 1,
wherein the acrylonitrile-butadiene-styrene graft copolymer has monomer a conversion rate of 93% or higher, and
coagulum of the acrylonitrile-butadiene-styrene graft copolymer is 0.06 weight % or higher.

16. An acrylonitrile-butadiene-styrene thermoplastic resin comprising 20 weight % to 50 weight % of the acrylonitrile-butadiene-styrene graft copolymer of claims 15 and 50 weight % to 80 weight % of a styrene-acrylonitrile copolymer.

17. The acrylonitrile-butadiene-styrene thermoplastic resin of claim 16, wherein a gloss value of the acrylonitrile-butadiene-styrene thermoplastic resin measured at 45° using a gloss meter according to ASTM D-528 is 90 or higher.

18. The acrylonitrile-butadiene-styrene thermoplastic resin of claim 16, wherein, when rubber content is less than 20 parts by weight, Izod impact strength according to ASTM D256 of the acrylonitrile-butadiene-styrene thermoplastic resin is 32 kgf·m/m or higher at specimen thickness of ¼" and 35 kgf·m/m or higher at specimen thickness of ⅛", and
when rubber content is 20 parts by weight or more, it is 38 kgf·m/m or higher at specimen thickness of ¼" and 43 kgf·m/m or higher at specimen thickness of ⅛".

* * * * *